(12) United States Patent
Chino (10) Patent No.: US 7,001,061 B2
(45) Date of Patent: Feb. 21, 2006

(54) ILLUMINATION APPARATUS WITH HOUSING FRAME INCLUDING CUT-OUT PORTION FOR FPC

(75) Inventor: Toshinori Chino, Iwata-gun (JP)

(73) Assignee: MInebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 10/462,767

(22) Filed: Jun. 17, 2003

(65) Prior Publication Data

US 2004/0037063 A1  Feb. 26, 2004

(30) Foreign Application Priority Data

Aug. 26, 2002  (JP) ............... 2002-245363

(51) Int. Cl.
*F21V 7/04* (2006.01)
(52) U.S. Cl. ..................... 362/633; 362/631
(58) Field of Classification Search ............... 362/558, 362/561, 555, 31, 27, 26, 633, 631, 630, 362/23, 29, 600, 611, 615, 632, 551, 559; 349/65, 58, 60, 56, 61, 62
See application file for complete search history.

(56) References Cited

U.S. PATENT DOCUMENTS

| | | | |
|---|---|---|---|
| 6,390,639 B1 * | 5/2002 | Suzuki et al. | 362/31 |
| 6,499,852 B1 * | 12/2002 | Kino et al. | 362/23 |
| 6,517,229 B1 * | 2/2003 | Suzuki et al. | 362/31 |
| 6,616,316 B1 * | 9/2003 | Takayanagi et al. | 362/561 |
| 6,629,765 B1 * | 10/2003 | Toyoda et al. | 362/631 |
| 6,665,038 B1 * | 12/2003 | Endo | 349/65 |
| 6,715,896 B1 * | 4/2004 | Kawashima et al. | 362/31 |
| 6,733,148 B1 * | 5/2004 | Nishioka | 362/31 |
| 2003/0026086 A1 * | 2/2003 | Kawashima et al. | 362/31 |

FOREIGN PATENT DOCUMENTS

JP   A 2001-234887   8/2001

\* cited by examiner

*Primary Examiner*—Thomas M Sember
*Assistant Examiner*—Ismael Negron
(74) *Attorney, Agent, or Firm*—Oliff & Berridge, PLC (57) ABSTRACT

A spread illuminating apparatus including a housing frame, the housing frame including respective positioning means for a light conductive bar, and a light conductive plate, and a recess for positioning a spot-like light source. The spot-like light source is mounted on a flexible printed circuit (FPC) that extends from a bottom surface of the housing frame through side and top surfaces thereof, and reaches the recess, in which the spot-like light source is housed. A cut-out for accommodating the FPC is formed in a top surface of the housing frame, and two slots for receiving the ends of the FPC are formed at both side walls of the cut-out, whereby the spot-like light source can be fixedly set in place.

19 Claims, 6 Drawing Sheets

ILLUMINATION APPARATUS WITH HOUSING FRAME INCLUDING CUT-OUT PORTION FOR FPC

BACKGROUND OF THE INVENTION

1. Field of the Invention

The present invention relates to a spread illuminating apparatus, and more particularly to a spread illuminating apparatus used as an illuminating means for a liquid crystal display.

2. Description of the Related Art

A liquid crystal display (hereinafter, referred to as "LCD") characterized by its low profile, small occupying volume and light weight has been extensively used in a lot of electric products including cellular phones and personal computers, and a demand therefor has been increasing. Since a liquid crystal which is a structural element of the LCD does not emit light by itself, a separate illuminating means besides the LCD is needed when used in dark places where sunlight or room light is not satisfactorily available. In order to satisfy the above requirement, in recent years, a low profile spread illuminating apparatus of side light system (light conductive bar system) has been often used for irradiating the LCD. Thus, in particular, an illuminating means small in size and low in power consumption is required.

Figure 6:
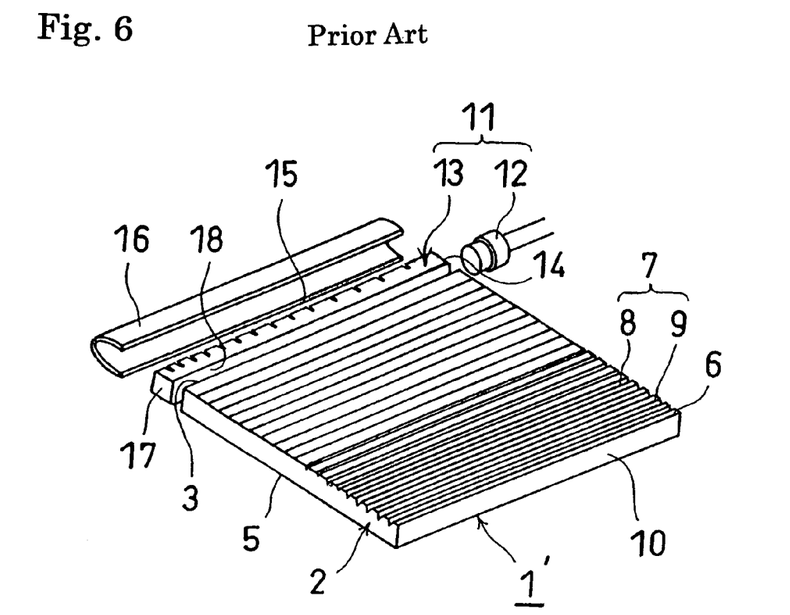
FIG. 6 shows a basic configuration of a conventional spread illuminating apparatus.

FIG. 6 shows a basic structure of a conventional spread illuminating apparatus 1' of side light system. The spread illuminating apparatus 1' generally comprises a light conductive plate 2 made of a light-transmissible material, a bar-like lamp 11 consisting of a spot-like light source 12 and a light conductive bar 13 disposed along and close to one end surface 3 of the light conductive plate 2, and a light reflecting member (a reflector) 16 covering three relevant side surfaces of the light conductive bar 13. Light rays emitted from the lamp 11 are allowed to enter the light conductive plate 2 and reflected to irradiate an LCD (not shown) disposed close to a bottom surface of the light conductive plate 2.

The light conductive bar 13, which constitutes the lamp 11, is made of a bar-like light-transmissible material and is disposed along the one end surface 3 of the light conductive plate 2 at a predetermined distance. And the spot-like light source 12, for example, a light emitting diode, is disposed in such a manner as to face one end surface 14 of the light conductive bar 13. An optical path conversion means 15 is formed on a side surface of the light conductive bar 13 opposite to a side surface 18 facing the end surface 3 of the light conductive plate 2. The optical path conversion means 15 comprises, for example, a plurality of grooves arrayed continuously and each having a triangular cross section, and has a function to allow light rays emitted from the spot-like light source 12 to enter the light conductive plate 2 through its end surface 3 in a uniform manner entirely.

A light reflection pattern 7 is formed on a top major surface 6 of the light conductive plate 2 and comprises a plurality of grooves 8 formed parallel to the longitudinal direction of the light conductive bar 13 at predetermined intervals and each having a triangular cross section and a plurality of flat portions 9 each formed between adjacent grooves 8. The grooves 8 are different in depth from one another, specifically, have their depths gradually increasing in proportion to the distance from the end surface 3 of the light conductive plate 2 in order to realize a uniform spread light emission over the light conductive plate 2 independent of the distance from the light conductive bar 13 (lamp 11) for uniform irradiation on the LCD set on the bottom surface of the light conductive plate 2.

The light reflecting member (the reflector) 16 covers the longitudinal side surfaces of the light conductive bar 13 except the side surface 18 facing the light conductive plate 2 so as to allow the light rays emitted from the spot-like light source 12 into the light conductive bar 13 to efficiently enter the light conductive plate 2. The reflector 16 has, on its inner surface, a film on which a metal such as silver is vapor-deposited, a sheet-like material on which a white paint is coated, or a bent metal sheet such as aluminum sheet, stainless steel sheet or the like.

Figure 7:
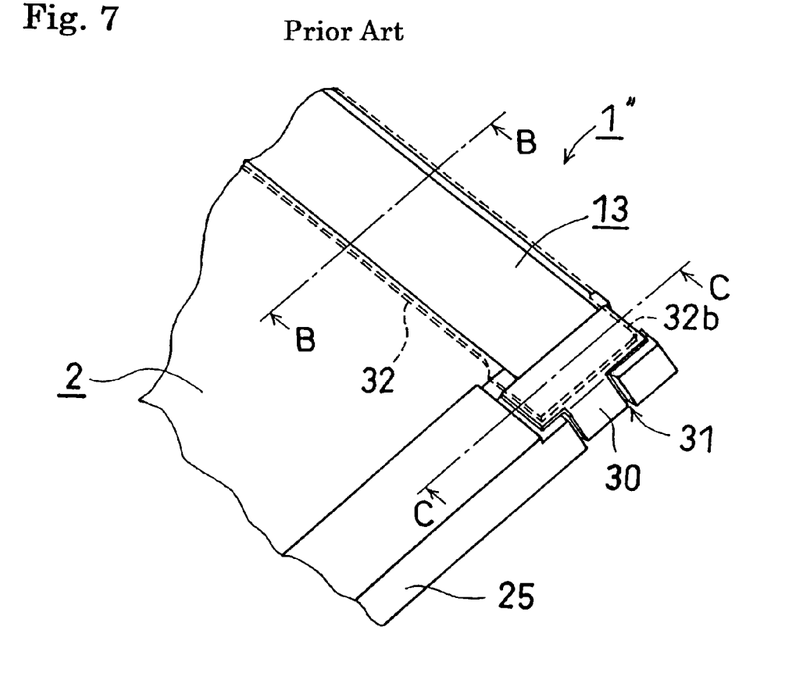
FIG. 7 shows a perspective view of a conventional spread illuminating apparatus having a housing frame.
Figure 8:
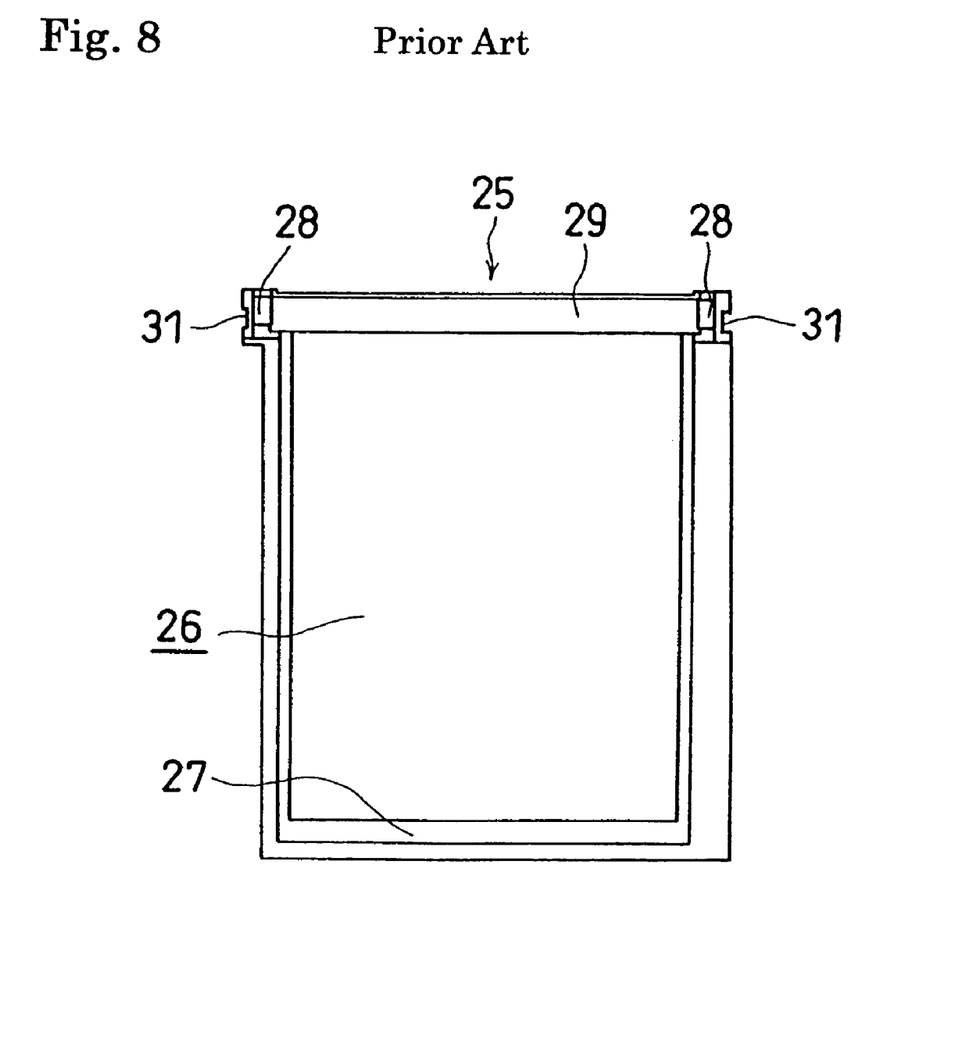
FIG. 8 shows a top plan view of a housing frame of the conventional spread illuminating apparatus shown in FIG. 8.
Figure 9A:
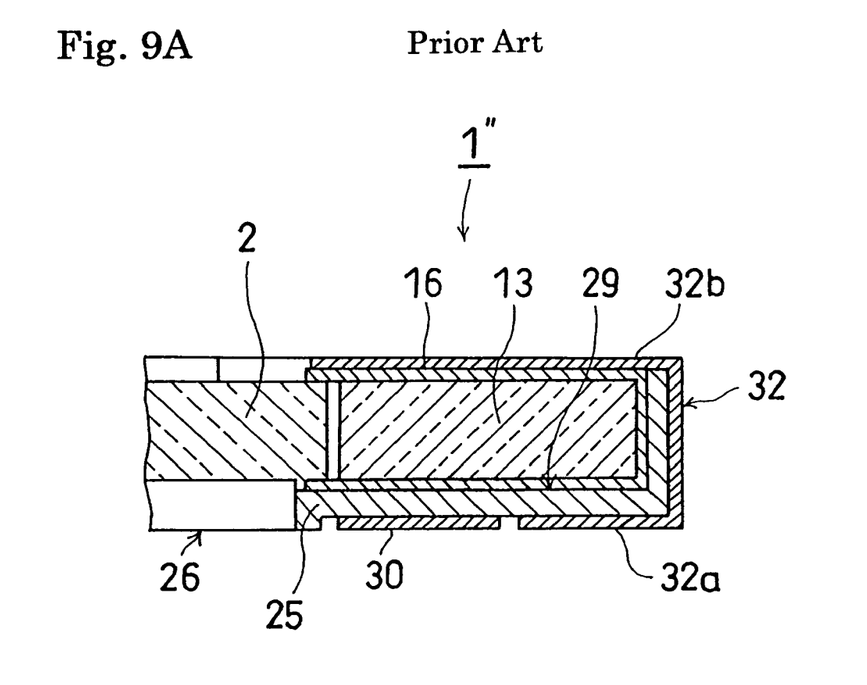
FIG. 9A shows a cross-sectional view taken along a line B—B of FIG. 7.
Figure 9B:
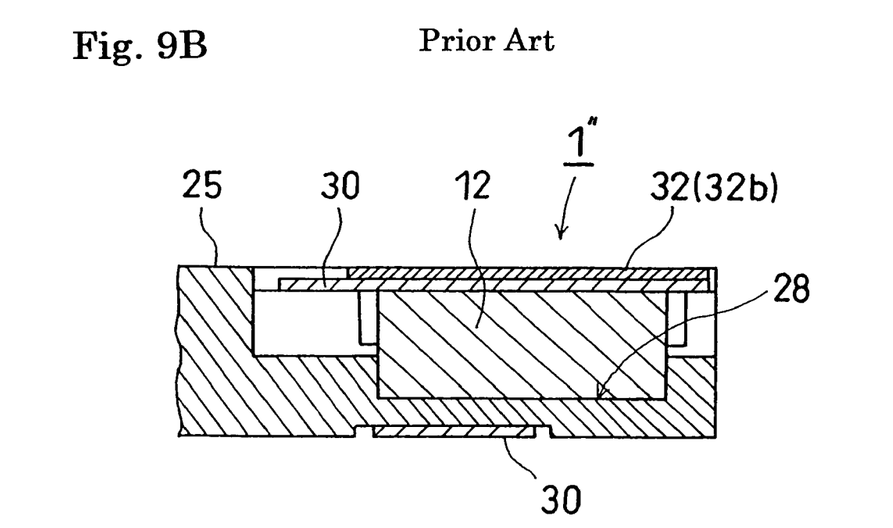
FIG. 9B shows a cross-sectional view taken along a line C—C of FIG. 7.

FIG. 7 shows a perspective view of a relevant portion of a conventional spread illuminating apparatus having a housing frame for positioning and fixedly putting together constituent components such as the above-described light conductive plate, light conductive bar and spot-like light source at their respective predetermined locations. FIG. 8 shows a top plan view of the housing frame. Also, FIG. 9A shows a cross-sectional view taken along a line B—B of FIG. 7, and FIG. 9B shows a cross-sectional view taken along a line C—C of FIG. 7. The above-described spread illuminating apparatus was proposed in Japanese Patent Application No. 2001-234887.

A spread illuminating apparatus 1" shown in FIG. 7 is provided with a housing frame 25 having a mechanism for positioning a spot-like light source 12 (a light emitting diode), a light conductive bar 13 and a light conductive plate 2. The housing frame 25 is made of resin and shaped like a frame. Referring to FIG. 8, the housing frame 25 has a frame-like seat section 27 for positioning the light conductive plate 2 defining an open space 26. Also, the housing frame 25 has, at its one side (an upper side in FIG. 8), recesses 28 and 28 for positioning respective spot-like light sources 12 (not shown in FIG. 8), a flat seat section 29 for positioning the light conductive bar 13. And the housing frame 25 has, at its both sides and close to the recesses 28 and 28, grooves 31 and 31 as guiding sections for an FPC 30 on which the spot-like light sources 12 and 12 are mounted.

As shown in FIGS. 7 and 9B (only one spot-like light source out of the two will be shown for explanation), the FPC 30 is structured so as to extend from the bottom surface of the housing frame 25, through the side surface thereof where it is guided with the groove 31, and through the top surface thereof, and to reach the recess 28 for positioning the spot-like light source 12. The spot-like light source 12 mounted on the FPC 30 is fitted into the recess 28 from the top surface side of the housing frame 25.

As shown in FIGS. 7, 9A and 9B, the spread illuminating apparatus 1" has a reinforcing frame 32 covering the recess 28 for positioning the spot-like light source 12 and the flat seat section 29 for positioning the light conductive bar 13 from the top surface or from both the top and bottom surfaces. The reinforcing frame 32 has a squared U-shaped cross section and is made of a metal such as a stainless steel. The reinforcing frame 32 comprises a wing portion 32a which is located on the lower surface of the housing frame 25 and which is formed in such a manner as to keep clear of the FPC 30 located on the lower surface of the housing frame 25, and a wing portion 32b which is configured so as to press the FPC 30 as well as the spot-like light source against the recess 28.

The spread illuminating apparatus having the housing frame with the above-described configuration has a certain advantage in that the assembly accuracy can be stabilized or the workability in precisely positioning the components can be enhanced on condition that the light conductive plate 2, the light conductive bar 13 and the spot-like light sources 12 are attached to their respective predetermined positions of the housing frame 25.

However, since the FPC 30 on which the spot-like light sources 12 is mounted extends from the bottom surface of the housing frame 25 through the side surface to the top surface thereof, a surface of the FPC 30 is brought into contact with an edge of the top surface of the housing frame 25. Further, since the FPC 30 together with the spot-like light source is pressed against the recess 28 by the reinforcing frame 32, the FPC 30 is also brought into contact with the top surface of the housing frame 25. Consequently, conductive pattern 41 formed on the surface of the FPC 30 can be broken.

Further, since the spot-like light source 12 mounted on the FPC 30 has to be securely fixed to the recess 28, a temporary fixing tape (for example, a double-face adhesive tape) is stuck on the bottom surface of the spot-like light source 12. The working process is done manually, requiring an additional assembly process, and therefore, an improved workability is required.

SUMMARY OF THE INVENTION

The present invention has been made in the light of the above problems, and its object is to provide a spread illuminating apparatus each component of which can be correctly and securely fixed to a housing frame, thereby improving both reliability and assembly workability thereof.

In order to achieve the above object, according to a first aspect of the present invention, a spread illuminating apparatus of side light system comprises: a light conductive plate made of a light-transmissible material; a light conductive bar disposed along and close to at least one end surface of the light conductive plate; a spot-like light source mounted on an FPC, disposed in such a manner as to face at least one end surface of the light conductive bar, and adapted to emit light rays to be introduced into the light conductive plate through the light conductive bar; and a housing frame provided with a means for positioning the light conductive plate, a means for positioning the light conductive bar, and a recess for positioning the spot-like light source. In the spread illuminating apparatus, the FPC extends from the bottom surface of the housing frame through the side and top surfaces thereof, and reaches the recess for positioning the spot-like light source to thereby house therein the spot-like light source mounted on the FPC, and a cut-out for housing the FPC is formed in the upper surface of the housing frame. Consequently, the FPC can be prevented from coming into contact with the housing frame, whereby a conductive pattern formed on the stays free from damages and breakage caused by the contact, thus enhancing the reliability.

According to a second aspect of the present invention, in the spread illuminating apparatus of the first aspect, an outside edge at the bottom of the cut-out is rounded. Consequently, the conductive pattern of the FPC can be prevented from getting so seriously damaged as to be broken even if the FPC accidentally comes into contact with the outside edge.

According to a third aspect of the present invention, in the spread illuminating apparatus of the first aspect, an outside edge at the bottom of the cut-out is chamfered. This brings about the same effect as the second aspect.

According to a fourth aspect of the present invention, in the spread illuminating apparatus of the first to third aspects, a slot, which an edge of the FPC is snapped into thereby positioning the spot-like light source with respect to the light conductive bar, is formed on at least one side wall of the cut-out at its midpoint height. Consequently, the spot-like light source mounted on the FPC can be readily and surely positioned in place with respect to the light conductive bar, thereby improving the workability and stabilizing the assembly accuracy. Also, the FPC is surely held clear of the housing frame, thereby ensuring the prevention of the FPC coming into contact with the housing frame thus preventing the conductive pattern of the FPC from getting damaged or broken, further enhancing the reliability.

According to a fifth aspect of the present invention, in the spread illuminating apparatus of the fourth aspect, a vertical position of the slot is set such that a distance from the slot to the bottom of the recess for positioning the spot-like light source is equivalent to the height of the spot-like light source. Consequently, if the FPC has its one or both ends snapped into the slot(s), the bottom of the spot-like light source mounted on the FPC can be readily and surely set to the bottom of the positioning means for the spot-like light source, thus improving the workability and stabilizing the assembly accuracy.

According to a sixth aspect of the present invention, in the spread illuminating apparatus of the first to fifth aspects, the housing frame is made of thermoplastic resin. Consequently, even if the FPC should come into contact with the housing frame by any chance, the conductive pattern of the FPC is prevented from getting seriously damaged, thus enhancing the reliability.

DETAILED DESCRIPTION OF THE PREFERRED EMBODIMENTS

Preferred embodiments of the present invention will hereinafter be explained with reference to the accompanying drawings. In the drawings, sections and components that are the same as or equivalent to those in the conventional embodiment shown in FIG. 8 are represented by the same reference numbers, and detailed descriptions thereof are omitted.

Figure 1:
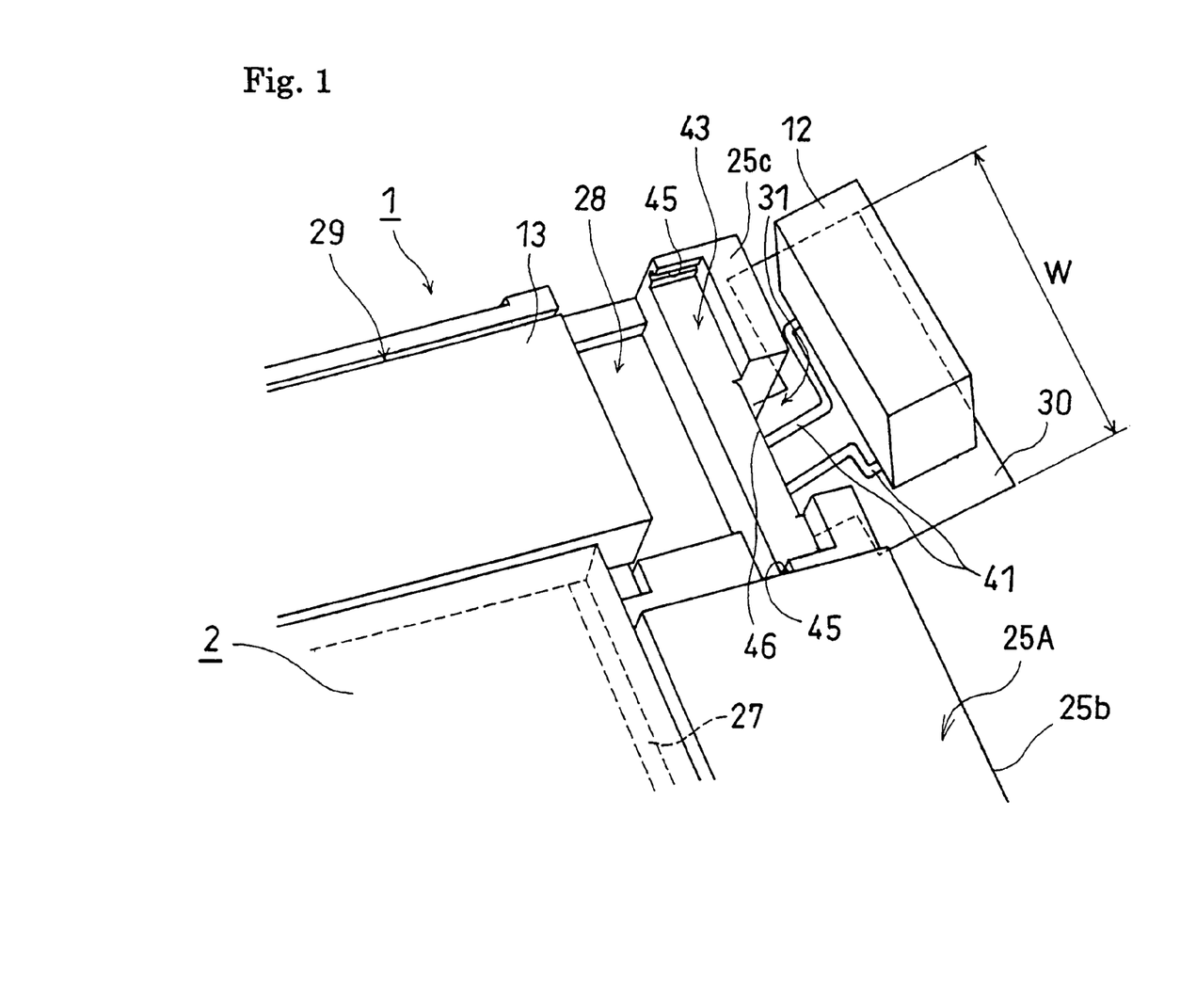
FIG. 1 shows a perspective view of a relevant portion of a spread illuminating apparatus according to an embodiment of the present invention.

A first embodiment will now be discussed. Referring to FIG. 1, a spread illuminating apparatus 1 is provided with a housing frame 25A which is a resin-molded product same as the housing frame 25 shown in FIG. 8. The housing frame 25A has a mechanism for positioning spot-like light sources 12 and 12, a light conductive bar 13, and a light conductive plate 2 at their respective predetermined locations. Specifically, the positioning mechanism includes recesses 28 and 28 for the spot-like light sources 12 and 12, a flat seat section 29 for the light conductive bar 13, and a frame-like seat section 27 for the light conductive plate 2.

Figure 2:
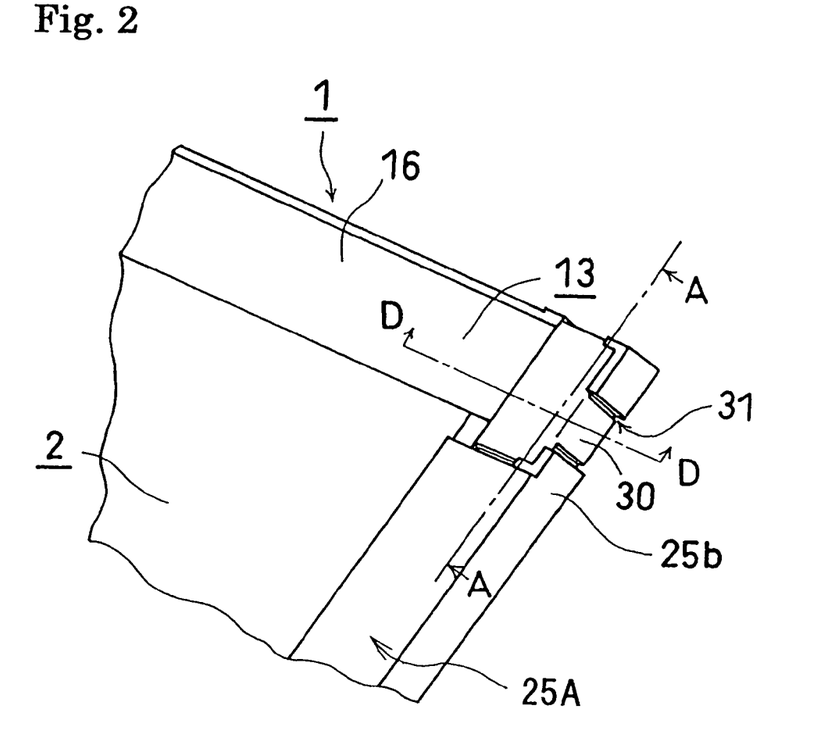
FIG. 2 shows a perspective view of the relevant portion shown in FIG. 1 at a different angle.
Figure 3:
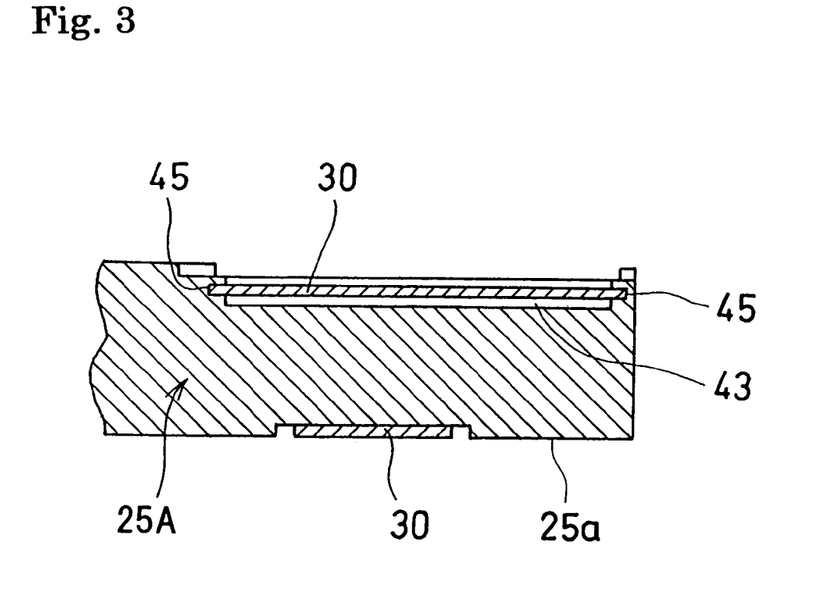
FIG. 3 shows a cross-sectional view taken along a line A—A of FIG. 2.
Figure 4:
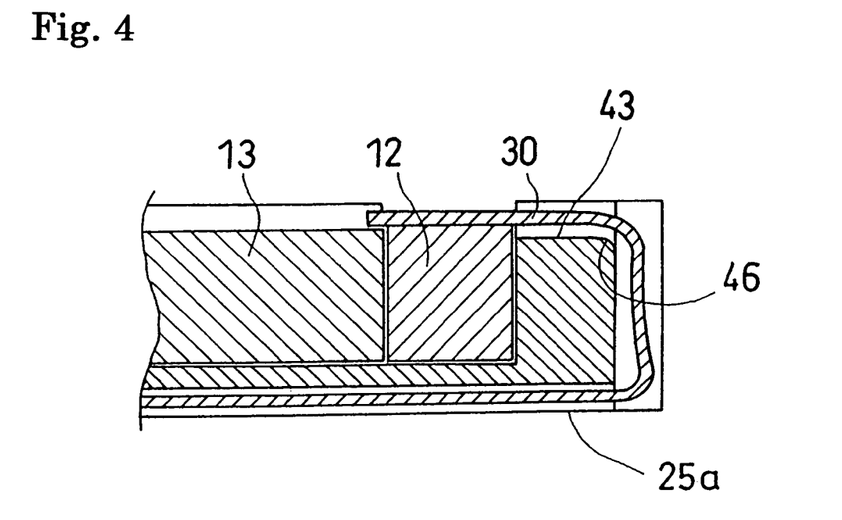
FIG. 4 shows a cross-sectional view taken along a line D—D of FIG. 2.

As shown in FIG. 1 (only one spot-like light source 12 out of the two will be mentioned for explanation), the spot-like light source 12, for example, a light emitting diode, is mounted on an FPC 30 by soldering. As shown in FIGS. 2 to 4, the FPC 30 on which the spot-like light source 12 is mounted extends from a bottom surface 25a of the housing frame 25A through a side surface 25b and a top surface 25c thereof, and reaches the recess 28 for positioning the spot-like light source 12.

The spot-like light source 12 is set into the recess 28 from its top side, and may easily slip out of the recess 28. Also, a depth of the recess 28 is set such that the spot-like light source 12 is optimally positioned with respect to the light conductive bar 13 when the spot-like light source 12 is set in place to touch a bottom of the recess 28.

A conductive pattern 41 is formed on a surface of the FPC 30. The spot-like light source 12 is turned on and off by signals given through the conductive pattern 41.

A groove 31 as a guiding section for the FPC 30 is formed on a side surface 25b of the housing frame 25A. Also, a cut-out 43 in which a part of the FPC 30 extending from the side surface 25b is housed is formed adjacent to the recess 28 in the top surface 25c of the housing frame 25A. An outside edge 46 of the cut-out 43, which is formed by a bottom of the groove 31 and a bottom of the cut-out 43, is worked upon (for example, rounded) to prevent damages to the FPC 30. Also, two slots 45 and 45 for positioning and fixing the FPC 30 at the cut-out 43 are formed respectively on both side walls of the cut-out 43 at a midpoint of the wall height. Consequently, the FPC 30 can be set in place in the cut-out 43 when the FPC 30 has its both ends snapped into respective slots 45 and 45.

Since the both ends of the FPC 30 are snapped into the respective slots 45 and 45, a distance between bottoms of the two slots 45 is set to be substantially equal to a width W of the FPC 30. Further, since the spot-like light source 12 may easily slip out of the recess 28 as described above, a depth of the slot 45 is set to be large enough to temporarily hold the spot-like light source 12 in the recess 28 when the both ends of the FPC 30 are snapped into the respective slots 45 and 45. Further, a width of the slot 45 is set to allow the FPC 30 to easily snap into and at the same time not to allow the snapped-in FPC to move greatly. Accordingly, the width of the slot 45 is set to be slightly larger than the thickness of the FPC 30.

Considering the requirements of the slot 45, a width of the cut-out 43 is set to be smaller than the width W of the FPC 30. And, considering the width of the slot 45 and a tolerance of contact between the FPC 30 and the other components, a depth of the cut-out 43 is set to be at least three times as large as the thickness of the FPC 30.

And, a vertical position of the slot 45 on the side wall of the cut-out 43 is set such that the distance from the slot 45 to the bottom of the recess 28 for positioning the spot-like light source 12 is equivalent to a height of the spot-like light source 12. In other words, the vertical position of the slot 45 is set such that when the FPC 30 is snapped into the slots 45, the snapped-in portions of the FPC 30 are substantially flush with the portion of the FPC on which the spot-like light source 12 is mounted, thereby temporarily holding the spot-like light source 12 set in the recess 28.

As shown in FIG. 2, a light reflection member 16 is disposed in such a manner as to cover side surfaces of the light conductive bar 13. Further, a reinforcing frame 32 (not shown) is disposed in such a manner as to cover the recess 28 for the spot-like light source 12 and the flat seat section 29 for the light conductive bar 13. The light reflection member 16 and the reinforcing frame 32 both have the same shape and function as those shown in FIGS. 7, 9A and 9B, and for example, the reinforcing frame 32 is adapted to press the spot-like light source 12 (together with the FPC 30 and the light conductive bar 13) in depth directions of the recesses 28 and the flat seat section 29, thereby securely fixing the components. The housing frame 25A is made of thermoplastic resin (for example, polycarbonate, ABS resin and polyethylene).

With the configuration described above, the FPC 30 extends from the bottom surface 25a of the housing frame 25A, is guided through the groove 31 formed on the side surface 25b thereof, further extends through the cut-out 43, and reaches the recess 28 formed in the top surface 25c thereof. Since the both ends of the FPC 30 are snapped into the respective slots 45 and 45, the spot-like light source 12 which is mounted on the FPC 30 and housed in the recess 28 does not slip out of the recess 28, and is temporarily fixed at its location predetermined with respect to the light conductive bar 13.

Further, since the FPC 30 extends through the groove 31 and the cut-out 43, the conductive pattern 41 formed on the surface of the FPC 30 can be disposed without coming into contact with the outside edge 46 of the cut-out 43, thereby preventing breakage of the conductive pattern 41 of the FPC 30 from occurring due to the contact between the FPC 3 and the outside edge 46. Further, since the outside edge 46 is rounded, even if the conductive pattern 41 accidentally comes into contact with the outside edge 46 during assembling process, the conductive pattern 41 is not so seriously damaged as to be broken. The outside edge 46 chamfered (for example, with a slant angle of 45 degrees) may bring about the same advantages.

And, although the spot-like light source 12 together with the FPC 30 is pressed against the recess 28 in its depth direction by the reinforcing frame 32 in order to be fixed at the optimum location with respect to the light conductive bar 13, since the both ends of the FPC 30 are snapped into the slots 45 and 45 formed respectively on the both side walls of the cut-out 43 opposing each other, the surface of the FPC 30 where the conductive pattern 41 is formed stays free from contact with the bottom of the cut-out 43, thereby preventing breakage of the conductive pattern 41 caused by contact between the FPC 30 and the bottom of the cut-out 43.

Figure 5:
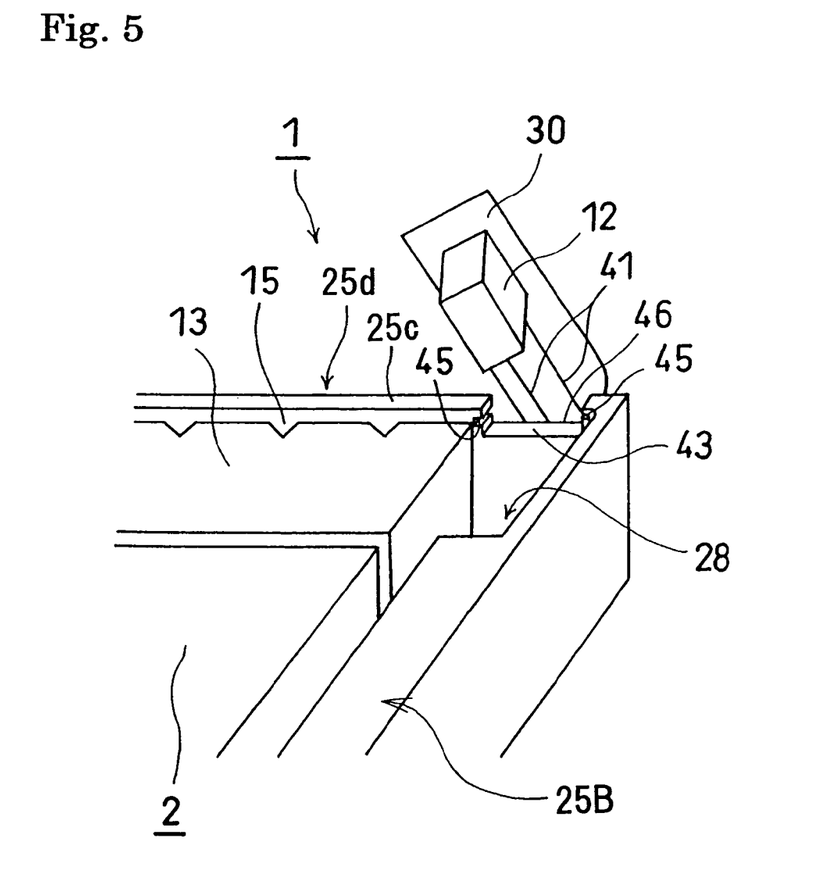
FIG. 5 shows a perspective view of a relevant portion of a spread illuminating apparatus according to another embodiment of the present invention.

A second embodiment of the present invention will be described with reference to FIG. 5. An FPC 30 on which a spot-like light source 12 is mounted extends from a bottom surface of a housing frame 25B, further extends through an end surface 25d thereof where an optical path conversion means 15 of a light conductive bar 13 is located, and reaches above a recess 28 formed in a top surface 25c thereof and adapted to position the spot-like light source 12. A cut-out 43 into which the FPC 30 is guided and through which it extends is formed in the top surface 25c of the housing frame 25B. Also, slots 45 and 45 are formed respectively on both side walls of the cut-out 43 at predetermined positions in such a manner as to oppose each other. Both ends of the FPC are snapped into respective slots 45 and 45 thereby duly positioning the FPC 30 within the cut-out 43. In this connection, the depth, width and vertical position of the slots 45, the distance between the two slots 45 and 45, and the width of the cut-out 43 are set in the same manner as in the first embodiment.

The spread illuminating apparatus according to the second embodiment has the same advantages as available in the first embodiment. And, in the second embodiment, since the FPC 30 extends through the end surface 25d, the area in the top surface 25c of the housing frame 25B which the FPC 30 extends through is smaller than the equivalent area in the first embodiment, thus downsizing the cut-out 43 formed in the top surface 25c.

In the embodiments described above, two slots 45 and 45 are formed respectively on both side walls of the cut-out 43, but alternatively a slot 45 may be formed only on one of the both side walls. In this case, the distance from the bottom of the slot 45 to the one side wall of the cut-out 43 is set to be equal to the width of the FPC 30.

What is claimed is:

1. A spread illuminating apparatus of side light system, comprising
   a light conductive plate made of a light-transmissible material;
   a light conductive bar disposed along and close to at least one end surface of said light conductive plate;
   a spot-like light source mounted on an FPC, disposed in such a manner as to face at least one end surface of said light conductive bar, and adapted to emit light rays to be introduced into said light conductive plate through said light conductive bar; and
   a housing frame provided with a positioning means for said light conductive plate, a positioning means for said light conductive bar, and a recess for positioning said spot-like light source, wherein:
   a top surface of said housing frame includes a cut-out portion for housing said FPC, said cut-out portion extending from a side surface of the housing frame to said recess for positioning said spot-like light source, and
   a portion of said FPC extends from a bottom surface of said housing frame, at least one of wraps around a portion of the side surface of the housing frame or through said cut-out portion, and further extends along at least a portion of said top surface of said housing frame.

2. A spread illuminating apparatus as set forth in claim 1, wherein said housing frame is made of thermoplastic resin.

3. A spread illuminating apparatus as set forth in claim 1, wherein an outside edge at a bottom of said cut-out portion is rounded.

4. A spread illuminating apparatus as set forth in claim 3, wherein a slot, which an edge of said FPC is snapped into thereby positioning said spot-like light source with respect to said light conductive bar, is formed on at least one side wall of said cut-out portion at its midpoint height.

5. A spread illuminating apparatus as set forth in claim 3, wherein said housing frame is made of thermoplastic resin.

6. A spread illuminating apparatus as set forth in claim 3, wherein a slot, which an edge of said FPC is snapped into thereby positioning said spot-like light source with respect to said light conductive bar, is formed on at least one side wall of said cut-out portion.

7. A spread illuminating apparatus as set forth in claim 1, wherein an outside edge at a bottom of said cut-out portion is chamfered.

8. A spread illuminating apparatus as set forth in claim 7, wherein a slot, which an edge of said FPC is snapped into thereby positioning said spot-like light source with respect to said light conductive bar, is formed on at least one side wall of said cut-out portion at its midpoint height.

9. A spread illuminating apparatus as set forth in claim 7, wherein said housing frame is made of thermoplastic resin.

10. A spread illuminating apparatus as set forth in claim 7, wherein a slot, which an edge of said FPC is snapped into thereby positioning said spot-like light source with respect to said light conductive bar, is formed on at least one side wall of said cut-out portion.

11. A spread illuminating apparatus as set forth in claim 1, wherein a slot, which an edge of said FPC is snapped into thereby positioning said spot-like light source with respect to said light conductive bar, is formed on at least one side wall of said cut-out portion at its midpoint height.

12. A spread illuminating apparatus as set forth in claim 11, wherein said housing frame is made of thermoplastic resin.

13. A spread illuminating apparatus as set forth in claim 11, wherein a vertical position of said slot is set such that a distance from said slot to a bottom of said recess for positioning said spot-like light source is equivalent to a height of said spot-like light source.

14. A spread illuminating apparatus as set forth in claim 13, wherein said housing frame is made of thermoplastic resin.

15. A spread illuminating apparatus of side light system, comprising:
    a first light conducting member made of a light-transmissible material;
    a second light conducting member, the second light conducting member being arranged substantially adjacent to at least a first surface of the first light conducting member;
    a light source arranged on a flexible printed circuit, the light source arranged to emit light rays toward at least one surface of the second light conducting member such that the emitted light rays travel through the second light conducting member and reach at least the first surface of the first light conducting member; and
    a housing member, the housing member comprising a receiving portion, the receiving portion being a portion of the housing member having at least one recess in an outer surface of the housing member, wherein
    an end portion of the flexible printed circuit at least partially overlaps a first surface and a second surface of the housing member, the first surface and the second surface extending substantially along two different directions, and
    when the flexible printed circuit including any components and conductive patterns arranged thereon is set into position in the receiving portion, the flexible printed circuit including any components and conductive patterns arranged thereon is contained within a space defined by the at least one recess or an internal space of the receiving portion.

16. A spread illuminating apparatus as set forth in claim 15, wherein the receiving portion comprises:
    a first recess having a first depth relative to a top-outer surface of the housing member;
    a second recess having a second depth relative to the top-outer surface of the housing member and being adjacent to the first recess, wherein the first depth is greater than the second depth; and a third recess having a third depth relative to an outer-side surface of the housing member and extending across an entire height of a sidewall, wherein the second depth and the third depth may be equal or different.

17. A spread illuminating apparatus as set forth in claim 16, wherein:
   the first depth is greater than a total of a height of the light source arranged on the flexible circuit board and a thickness of the flexible printed circuit on which the light source is arranged;
   the second depth and the third depth are at least greater than the thickness of the flexible printed circuit, such that a space exists between components and/or conductive patterns arranged on the flexible printed circuit and the housing member,
   wherein the first recess, the second recess and the third recess are arranged such that together, the first, second and third recesses form a single internal continuous space defining the receiving portion.

18. A spread illuminating apparatus as set forth in claim 17, wherein the second recess comprises a slot along at least one inner side wall of the housing member defining the second recess, such that when the flexible printed circuit is set into the receiving portion, at least one edge of the flexible printed circuit is snapped into the at least one slot.

19. A spread illuminating apparatus as set forth in claim 18, wherein:
   a width of the at least one slot is slightly larger than the thickness of the flexible printed circuit such that when the flexible printed circuit is snapped into place, the flexible printed circuit is stationary.

* * * * *